United States Patent
Sato et al.

(10) Patent No.: US 6,853,407 B2
(45) Date of Patent: Feb. 8, 2005

(54) LIQUID CRYSTAL DISPLAY DEVICE INCLUDING A LIGHTLY DOPED DRAIN REGION

(75) Inventors: Tetsushi Sato, Tokyo (JP); Hiroyuki Sekine, Tokyo (JP); Kazuhide Yoshinaga, Tokyo (JP)

(73) Assignee: NEC Corporation, Tokyo (JP)

(*) Notice: Subject to any disclaimer, the term of this patent is extended or adjusted under 35 U.S.C. 154(b) by 9 days.

(21) Appl. No.: 10/196,356

(22) Filed: Jul. 17, 2002

(65) Prior Publication Data

US 2003/0016311 A1 Jan. 23, 2003

(30) Foreign Application Priority Data

Jul. 23, 2001 (JP) .................................... 2001-220829

(51) Int. Cl.[7] ...................... G02F 1/136; G02F 1/1333; H01L 29/04
(52) U.S. Cl. ............................ 349/43; 349/44; 349/110; 257/59; 257/72
(58) Field of Search .......................... 349/43, 44, 110, 349/111; 257/59, 72

(56) References Cited

U.S. PATENT DOCUMENTS

| | | | | |
|---|---|---|---|---|
| 6,172,721 B1 | * | 1/2001 | Murade et al. | 349/43 |
| 6,449,022 B1 | * | 9/2002 | Fukata et al. | 349/44 |
| 6,559,913 B1 | * | 5/2003 | Sera | 349/111 |

FOREIGN PATENT DOCUMENTS

| | | |
|---|---|---|
| JP | 11-326956 | 11/1999 |
| JP | 2000-356787 | 12/2000 |

* cited by examiner

*Primary Examiner*—Tarifur R. Chowdhury
(74) *Attorney, Agent, or Firm*—Young & Thompson

(57) ABSTRACT

Pixel TFTs (channels 201) are formed along gate lines 61 such that centers of the channels 201 are positioned in positions arranged on a line A—A passing through intermediate positions between adjacent two data lines 81. A gate side LDD region 41 and a pixel side LDD region 42 of the pixel TFT are formed symmetrically about the line A—A and the storage capacitors are formed symmetrically about the line A—A. With such construction, it is possible to make leakage currents in the two LDD regions of each of the pixel TFTs of a liquid crystal display device equal each other.

4 Claims, 15 Drawing Sheets

LIQUID CRYSTAL DISPLAY DEVICE INCLUDING A LIGHTLY DOPED DRAIN REGION

BACKGROUND OF THE INVENTION

1. Field of the Invention

The present invention relates to a liquid crystal display device and, particularly, to a liquid crystal display device for use as a light valve of a liquid crystal projector.

2. Description of the Prior Art

A liquid crystal display device has a basic construction including a pixel substrate, an opposed substrate opposing to the pixel substrate and a liquid crystal layer sealed in between the pixel substrate and the opposed substrate. On the pixel substrate, a plurality of switching elements such as TFTs (Thin Film Transistors) and a plurality of pixel electrodes, etc., are formed, respectively. A common electrode is formed on the opposed substrate and the opposed substrate is arranged in an opposing relation to the pixel substrate with a predetermined gap therebetween.

FIG. 1 is a plan view of one of pixels of a pixel substrate used in a conventional liquid crystal display device and associated components arranged around the pixel.

As shown in FIG. 1, in the conventional liquid crystal display device, each pixel TFT (channel region 201) is provided at a cross point of a gate line 61 and a data line 81. The channel regions 201 of the pixel TFTs are arranged vertically in the drawing sheet along the data lines 81. Further, in the conventional liquid crystal display device, substantially rectangular storage capacitors 204 are arranged along the gate lines 61.

A portion of the pixel TFT, which has highest light sensitivity, is LDD (Lightly Doped Drain) regions. That is, in FIG. 1, an LDD region 41 on the side of the data line 81 connected to a contact 202 and an LDD region 42 on the side of the data line 81 connected to a contact 204 of a pixel electrode are most sensitive to light.

When an amount of light incident on the data line side LDD region 41 is different from that incident on the pixel electrode side LDD region 42, there is a difference in leakage current between the LDD regions. Besides, since the liquid crystal display device is usually AC driven, electric fields of the data line side LDD region 41 and the pixel electrode side LDD region 42 become high alternately in every frame. Therefore, if there is the difference in leakage current between the data line side LDD region 41 and the pixel electrode side LDD region 42, luminance of the pixel becomes different in every frame, causing flickers to be generated on a display screen.

In order to prevent such flickers from occurring, it has been usual in the conventional liquid crystal display device to employ a construction in which the LDD regions 41 and 42 are optically shielded by an upper light shielding layer and a lower light shielding layer, which are provided above and below these regions.

A typical example of the light shielding structure of the conventional liquid crystal display device has lattice type upper and lower light shielding layers provided to cover the data lines, the gate lines and the pixel TFTs to thereby prevent light from irradiating the LDD regions. This light shielding structure is effective in a case where light fallen on the liquid crystal display device vertically. That is, according to this light shielding structure, the upper and lower light shielding layers can block light entering to the data line side LDD region and the pixel line side LDD region so long as light enters into the liquid crystal display device vertically.

However, light incident on the liquid crystal display device contains not only vertical components with respect to the liquid crystal display device but also various components having a certain incident angular distribution. Therefore, light incident on end portions of the upper light shielding layer may contain lights which are reflected by the lower light shielding layer, etc., repeatedly and directed to the LDD regions. Since, in the light shielding structure of the conventional liquid crystal display device, the amount of light directed to the data line side LDD region and the vicinity thereof is different from that directed to the pixel electrode side LDD region and the vicinity thereof, there is a problem that it is impossible to make leakage currents in the data line side LDD region and the pixel side LDD region equal each other. This problem will be described in detail with reference to FIG. 2 and FIG. 3.

FIG. 2 is a cross section taken along a line I—I in FIG. 1, that is, a cross section of a region including the data line side LDD region 41, and FIG. 3 is a cross section taken along a line J—J in FIG. 1, that is, a cross section of a region including the pixel line side LDD region 42.

Referring to FIG. 2, a lower light shielding layer 2 is formed on an upper surface of a glass substrate 1 and a first interlayer film 3 is formed to cover the lower light shielding layer 2. The data line side LDD region 41 is formed on the first interlayer film 3 and a gate insulating film 5 is formed on the data line side LDD region 41. On the gate insulating film 5, a second interlayer film 7 is formed to cover the gate insulating film. The data line 81 is formed on an upper surface of the second interlayer film 7 and a third interlayer film 9 is formed to cover the data line 81. The upper light shielding layer 10 is formed on the third interlayer film. Since the lower light shielding layer 2 and the upper light shielding layer 10 are formed along the data line, the light shielding layer 2 as well as the light shielding layer 10 is formed slightly wider than the data line 81.

On the other hand, referring to FIG. 3, a metal film 6 which is used as the storage capacitor line 62 is formed on a polysilicon layer 4 and a gate insulating film 5 on both sides of the pixel electrode side LDD 42 and the lower light shielding layer 2 and the upper light shielding layer 10 are formed to cover the metal film 6. That is, since the lower light shielding layer 2 and the upper light shielding layer 10 in this region are formed along the gate line 61, side portions of the lower light shielding layer 2 and the upper light shielding layer 10 in this region are extended regardless of the width of the data line 81.

As mentioned above, the width of the lower light shielding layer 2 as well as the upper light shielding layer 10 in the region including the data line side LDD region 41 is different from that in the region including the pixel electrode side LDD region 42. Therefore, there is a difference in amount of incident light between the respective LDD regions 41 and 42.

For example, light incident on the region surrounding the data line side LDD region 41 at a certain angle with respect to a normal line as shown by an arrow in FIG. 2 is directed to the lower light shielding layer 2 in the vicinity of an edge portion of the upper light shielding layer 10. This light is reflected by the lower light shielding layer 2 formed of a metal material, the data line 81 formed of a metal material and the lower light shielding layer 2 again and reaches the data line side LDD region 41. On the contrary, light incident on the vicinity of the pixel electrode side LDD 42 is blocked by the upper light shielding layer 10 and can not reach the lower light shielding layer 2 even when the incident angle of the light is the same as that shown in FIG. 2, as shown in FIG. 3.

As described, in the conventional liquid crystal display device, the light shielding structure in the data line side LDD region 41 is different from that in the pixel electrode side LDD region 42. Therefore, there is a problem that leakage currents in the data line side LDD region and the pixel side LDD region are different. Further, there is another problem that degradation of image quality such as flickers on the display screen occurs due to the difference in the leakage current.

These problems become specifically importance when the liquid crystal display device is used as a light valve of the liquid crystal projector. That is, according to a recent tendency of miniaturization of a projector casing and miniaturization of a liquid crystal panel in order to accommodate to reduction of cost while increasing the luminance of screens, an amount of light incident on a liquid crystal display device is increased, so that even a small difference of leakage current leads to degradation of image quality.

SUMMARY OF THE INVENTION

An object of the present invention is to provide a liquid crystal display device capable of equalizing leakage currents in a gate line side LDD region and a pixel electrode side LDD region of each pixel TFT thereof.

In order to prevent degradation of image quality caused by such as flickers, light shielding structures of the gate line side LDD region and the pixel electrode side LDD region are made identical so that leakage currents therein are made equal each other. However, in order to make the light shielding structures of the data line side LDD region and the pixel electrode side LDD region identical in the conventional liquid crystal display device in which the pixel TFTs are arranged along the data lines, the aperture ratio of each pixel region must be sacrificed considerably.

In view of this state of the art, the present invention restricts generation of flickers by making amounts of leakage currents in the data line side and pixel electrode side LDD regions equal each other by arranging pixel TFTs along gate lines and using identical light shielding structures in the data side LDD region 41 and the pixel electrode side LDD region 42.

That is, a liquid crystal display device according to the present invention, which includes a plurality of parallel gate lines formed on a transparent insulating substrate, a plurality of parallel data lines formed on the transparent insulating substrate, which are orthogonal to the gate lines and electrically insulated therefrom, and a plurality of transistors provided on the transparent insulating substrate correspondingly to respective pixel regions sectioned in matrix by the gate lines and the data lines, is featured by that each of the transistors includes a data line side LDD region and a pixel side LDD region provided along the data line with a gap with respect to the data line such that light shielding characteristics of the data line side LDD region becomes substantially equal to that of the pixel side LDD region.

In the above liquid crystal display device, each transistor may be arranged in a position remote from adjacent ones of the data lines by equal distances, that is, on an intermediate line between the data lines.

Alternatively, when each transistor is separated from the adjacent data lines by predetermined distances, the transistor may be arranged on the side of one of the adjacent data lines, to which the same transistor is connected.

In the liquid crystal display device in which each transistor is arranged on the side of one of the adjacent data lines, to which the same transistor is connected and which includes a storage capacitor formed along the gate line such that the transistor is positioned between the gate lines in every pixel region, the storage capacitor may have a protruded portion partially protruding on the side of the pixel side LDD region of the transistor along the gate line and on the side of the gate line. In the latter case, a contact of the pixel electrode is provided in this protruded portion.

In any of the above described liquid crystal display devices, a reflected light attenuating layer may be provided below a gate insulating film positioned below the gate line.

DETAILED DESCRIPTION OF THE PREFERRED EMBODIMENTS

Embodiments of the present invention will be described in detail with reference to the accompanying drawings.

The liquid crystal display device of the present invention comprises a pixel substrate on which a plurality of pixel electrodes, etc., are formed, an opposed substrate on which a common electrode, etc., is formed and a liquid crystal layer provided in a gap between the pixel substrate and the opposed substrate arranged in an opposing relation to the pixel substrate with a predetermined distance therebetween.

Since the present invention resides in a structure of the pixel electrode substrate, only the pixel substrate thereof will be described hereinafter.

Figure 1:
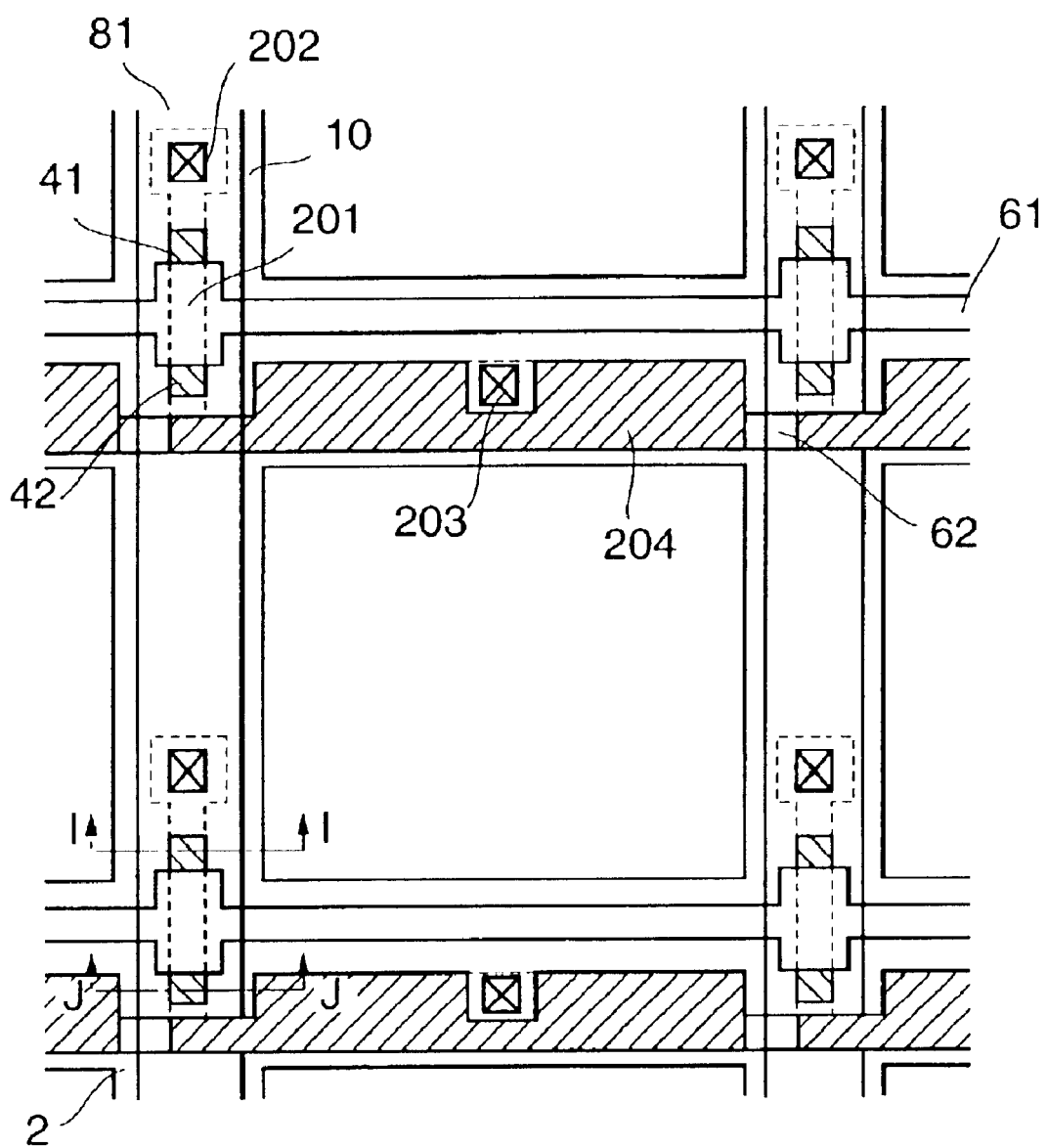
FIG. 1 is a plan view showing a portion of a pixel substrate used in a conventional liquid crystal display device.
Figure 2:
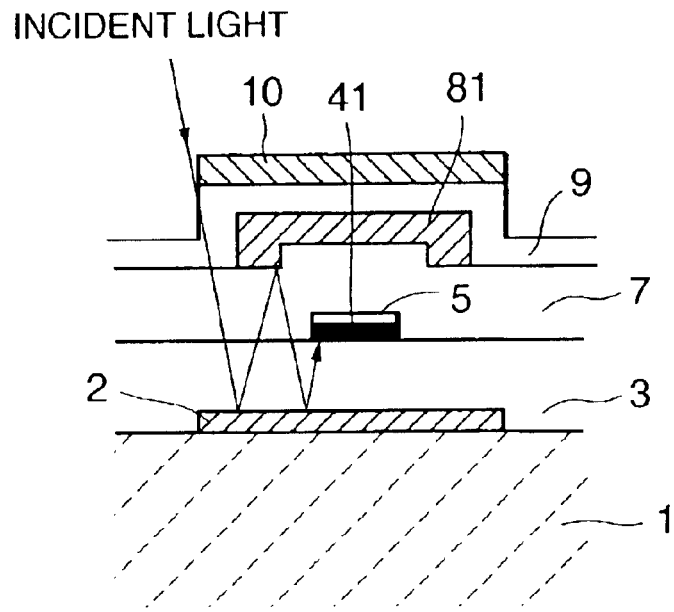
FIG. 2 is a cross section taken along a line I—I in FIG. 1.
Figure 3:
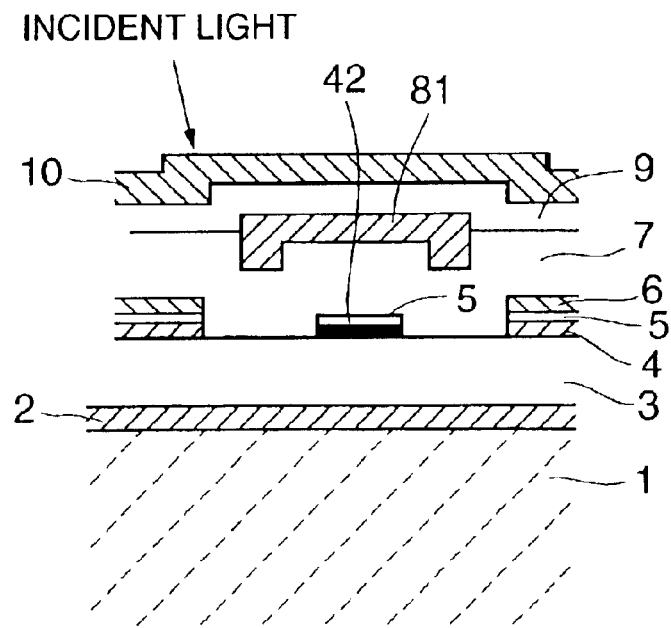
FIG. 3 is a cross section taken along a line J—J in FIG. 1.
Figure 4:
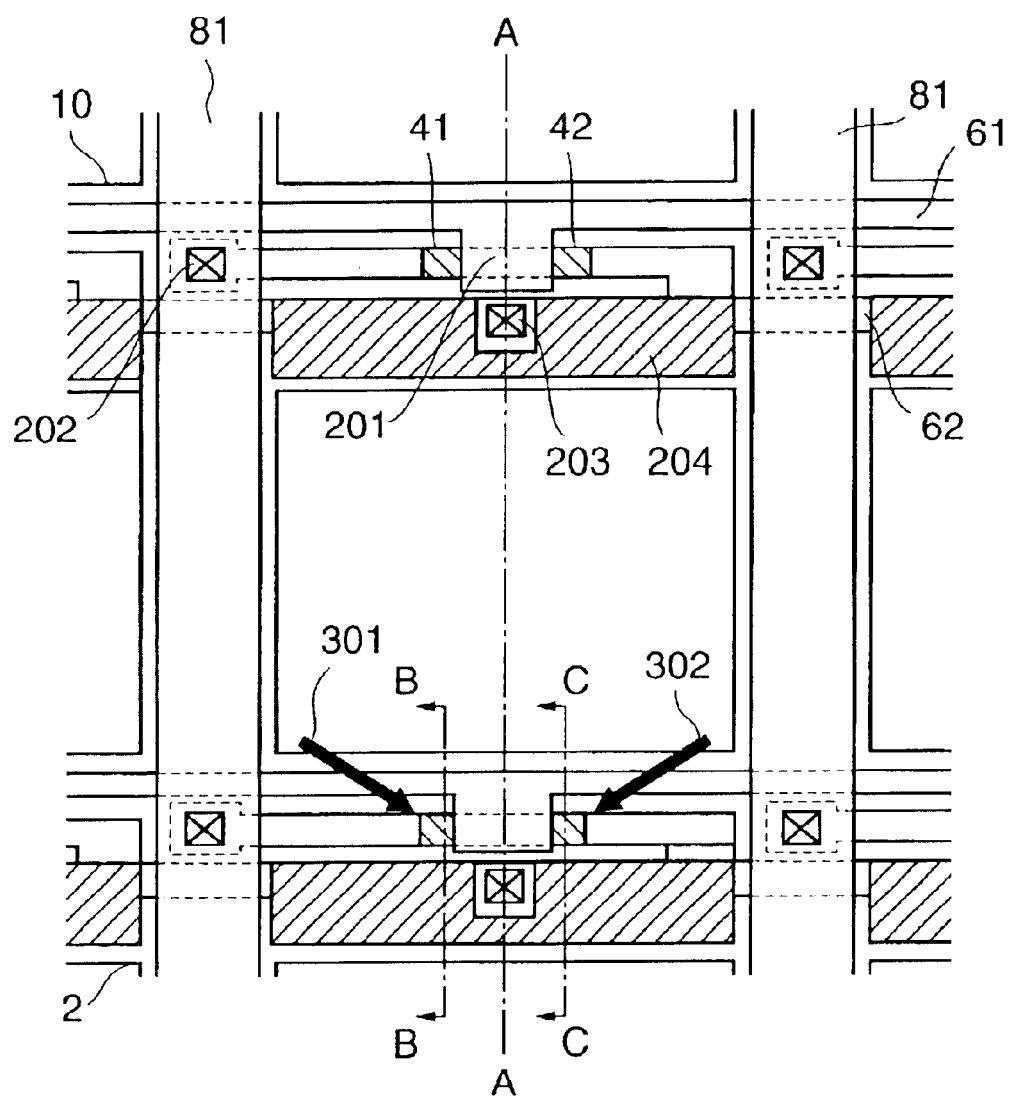
FIG. 4 is a plan view showing a portion of a pixel substrate used in a liquid crystal display device according to a first embodiment of the present invention.

FIG. 4 shows a pixel substrate of a liquid crystal display device according to a first embodiment of the present invention. Incidentally, FIG. 4 shows a portion of the pixel substrate of the liquid crystal display device, which includes one of a plurality of pixels and a peripheral portion thereof. The pixels are arranged in matrix on the pixel substrate.

As shown in FIG., 4, a plurality of parallel gate lines 61 and a plurality of parallel data lines 81 orthogonal to the gate lines are formed on the pixel substrate. One pixel region is defined by adjacent two gate lines 61 and adjacent two data lines 81. In concrete, the data line 81 shown in the left side portion in FIG. 4 and the gate line 61 shown in the upper side in FIG. 4 define the pixel region in the center of FIG. 4. The data line 81 shown in the right side portion and the upper gate line define a pixel region, which is not shown and positioned in the right side of the center pixel region, and the gate line 61 in the lower side and the left side data line define a pixel region, which is not shown and positioned below the center pixel region on the drawing sheet.

In the pixel substrate according to this embodiment, a pixel TFT forming a channel region 201 is arranged along the gate line 61 not on the data line 81 but in a center position between adjacent two data lines 81. A center of the channel region 201 is on a center line A—A between the adjacent two data lines.

The pixel TFT includes a data line side LDD region 41 connected to the data line 81 through a data line contact 202 and a pixel electrode side LDD region 42 connected to the pixel electrode through a pixel electrode contact 203. The data line side LDD region 41 and the pixel electrode side LDD region 42 are symmetrical about the line A—A.

Further, in the pixel substrate shown in FIG. 4, a center of the pixel electrode contact 203 is also on the line A—A and the storage capacitors 204 formed by a polysilicon layer and a gate metal layer are formed symmetrically about the line A—A.

A fabrication method of the pixel substrate shown in FIG. 4 will be described with reference to FIG. 5A to FIG. 5O. Incidentally, it should be noted that FIG. 5A to FIG. 5O merely illustrate fabrication steps of the pixel substrate and cross sectional views shown therein do not specify any specific portion of the pixel substrate shown in FIG. 4.

Figure 5A:
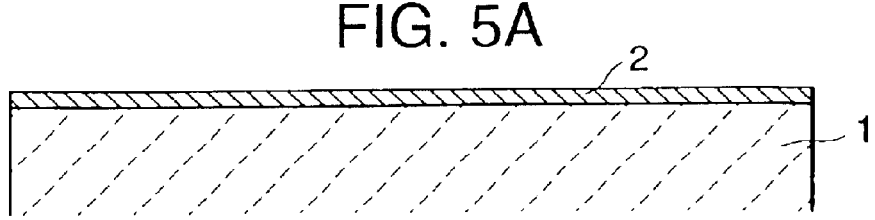
FIG. 5A to FIG. 5O are cross sections of the pixel substrate shown in FIG. 4, showing fabrication steps thereof.

First, as show in FIG. 5A, a lower light shield layer 2 is formed on a transparent insulating substrate 1, for example, a glass substrate. It is preferable that the lower light shield layer 2 has superior light shielding characteristics and heat durability so as to be not influenced by annealing to be performed during a formation of a polysilicon layer to be described later. In view of this, the lower light shield layer 2 is formed of WSi (Tungsten Silicide), etc.

Figure 5B:
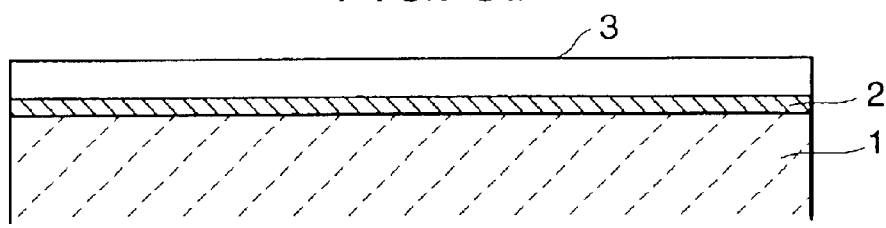

Next, as shown in FIG. 5B, a first interlayer film 3 is formed on the lower light shield layer 2 by using $SiO_2$, etc. Thickness of the first interlayer film 3 is selected such that the lower light shield layer 2 does not act as a back gate of the pixel TFT.

Figure 5C:
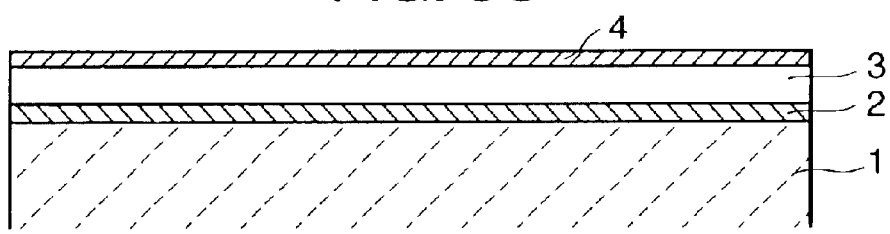

Thereafter, as shown in FIG. 5C, a polysilicon layer 4 is formed on the first interlayer film 3. The polysilicon layer 4 is formed by forming an amorphous silicon layer on the first interlayer film 3 and then subjecting the amorphous silicon layer to a laser annealing.

Figure 5D:
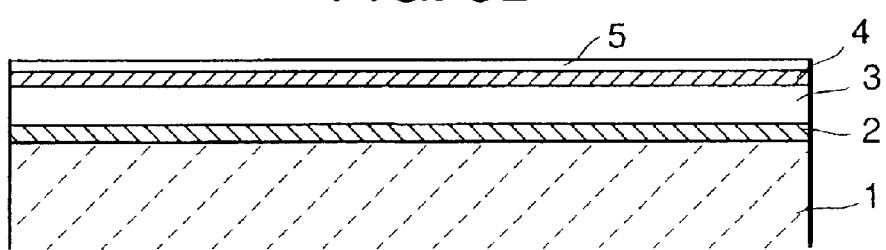

Next, as shown in FIG. 5D, a gate insulating film 5 is formed to cover the polysilicon layer 4. After the gate insulating film 5 is formed, portions of the polysilicon layer 4, which become a source, a drain and a storage capacitor, are doped with impurities.

Thereafter, as shown in FIG. E, the gate insulating film 5 and the polysilicon layer 4 are made an island by using photolithography and etching.

Figure 5E:
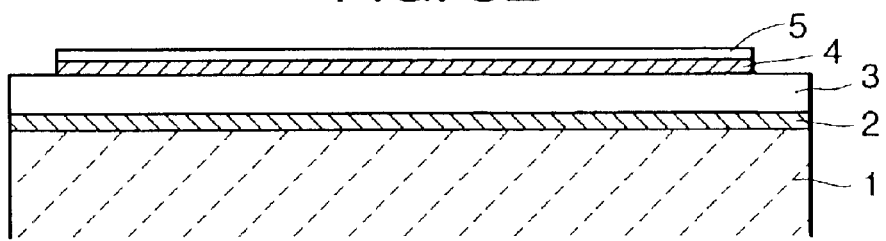
Figure 5F:
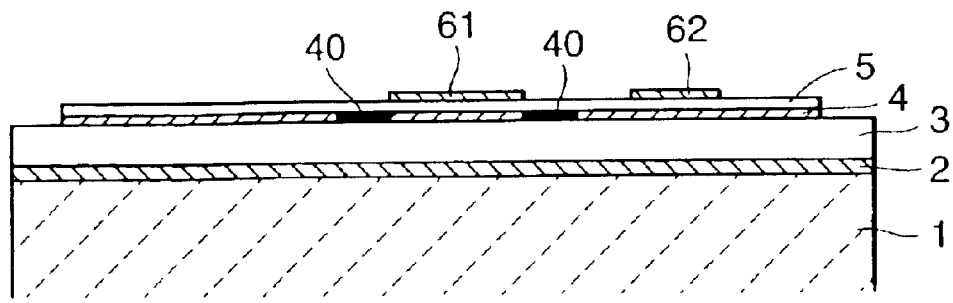

Next, a metal film 6 of such as WSi is formed and then a gate line 61 and a storage capacitor line 62 are selectively formed on the gate insulating film 5 by patterning the metal film 6 as shown in FIG. 5F. Thereafter, an LDD region 40 is formed by selectively doping the polysilicon layer 4 with impurity.

Figure 5G:
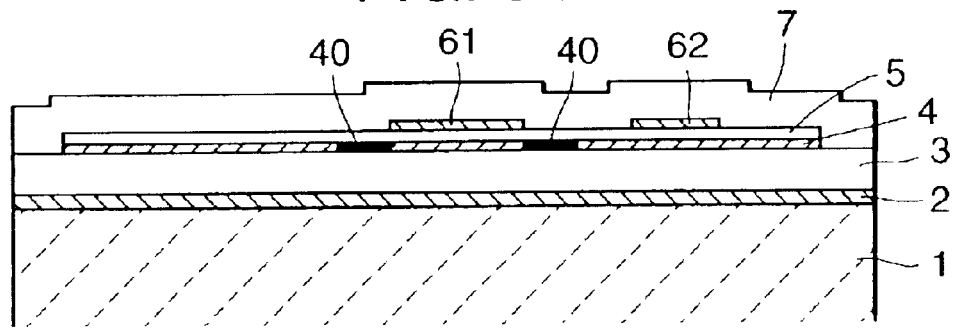

Thereafter, as shown in FIG. 5G, a second interlayer film 7 is formed on the wafer.

Figure 5H:
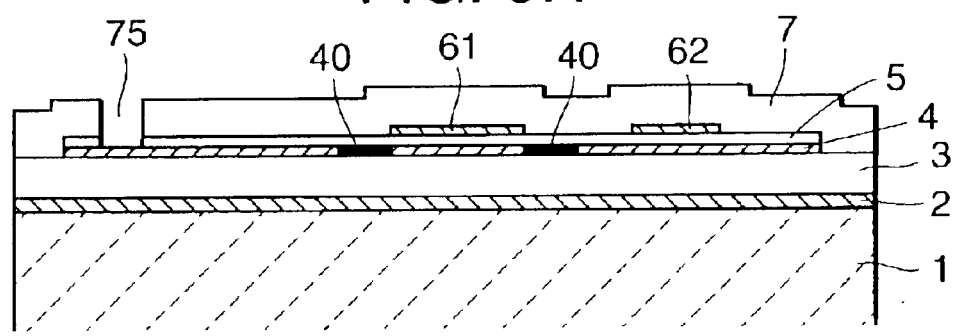

Next, as shown in FIG. 5H, a contact hole 75 is formed through the second interlayer film 7 and the gate insulating film 5 to expose the polysilicon layer 4 partially.

Figure 5I:
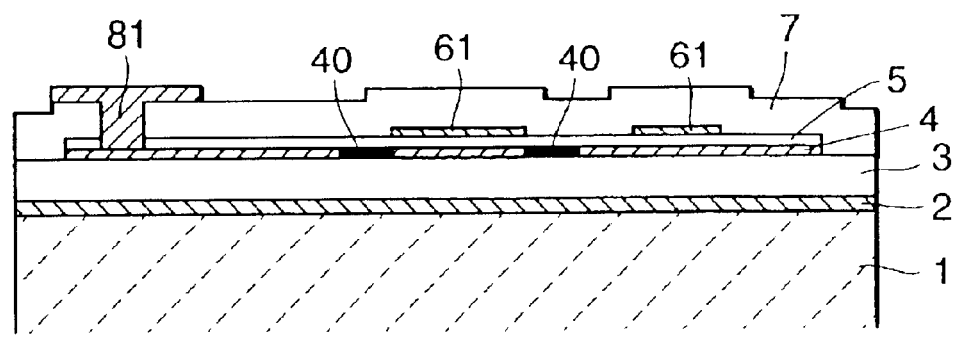

Thereafter, in order to form a data line 81 connected to the polysilicon layer 4 through the contact hole 75, a metal film of such as aluminum is formed on the wafer and the data line 81 is formed by patterning the thus formed metal film, as shown in FIG. 5I.

Figure 5J:
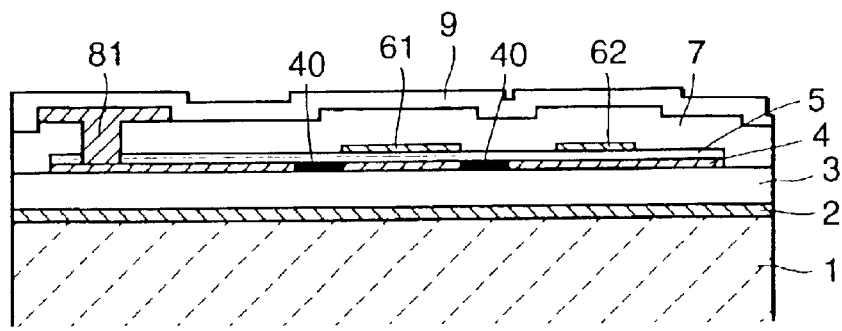
Figure 5K:
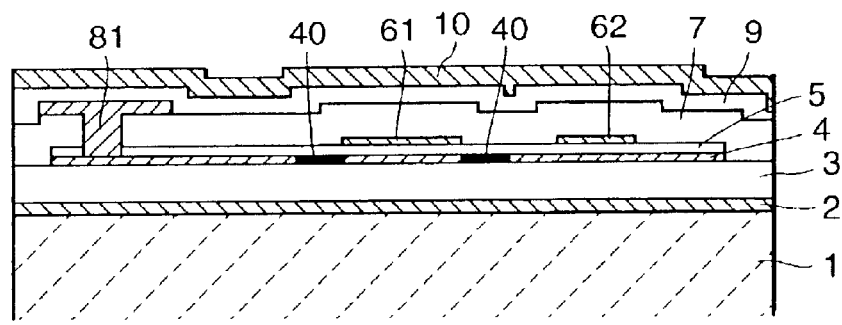
Figure 5L:
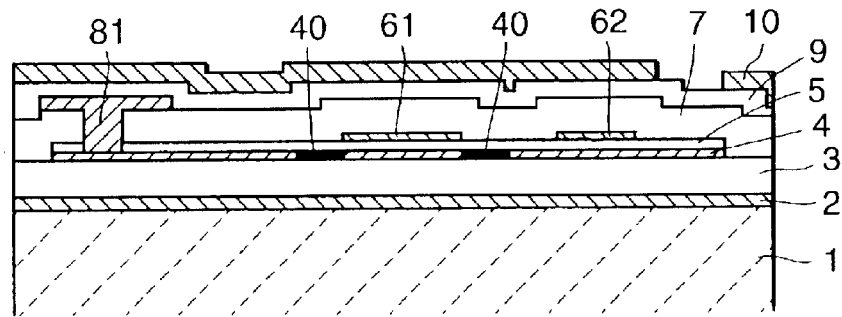

Next, as shown in FIG. 5J, a third interlayer film 9 is formed and then a metal film of such as aluminum is formed thereon as shown in FIG. 5K. By patterning the metal film, the upper light shield layer 10 is formed as shown in FIG. 5L.

Figure 5M:
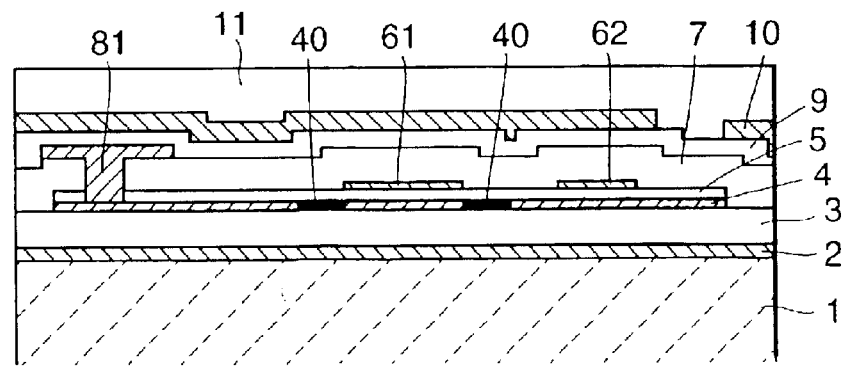

Thereafter, as shown in FIG. 5M, a flattening film 11 is formed by painting and baking.

Figure 5N:
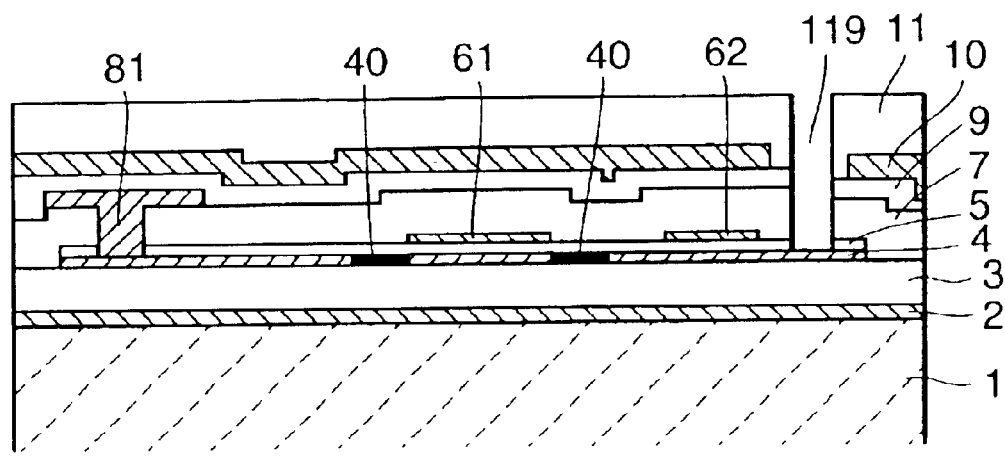

Next, as shown in FIG. 5N, a contact hole 119 for exposing a portion of the polysilicon layer 4 is formed.

Figure 5O:
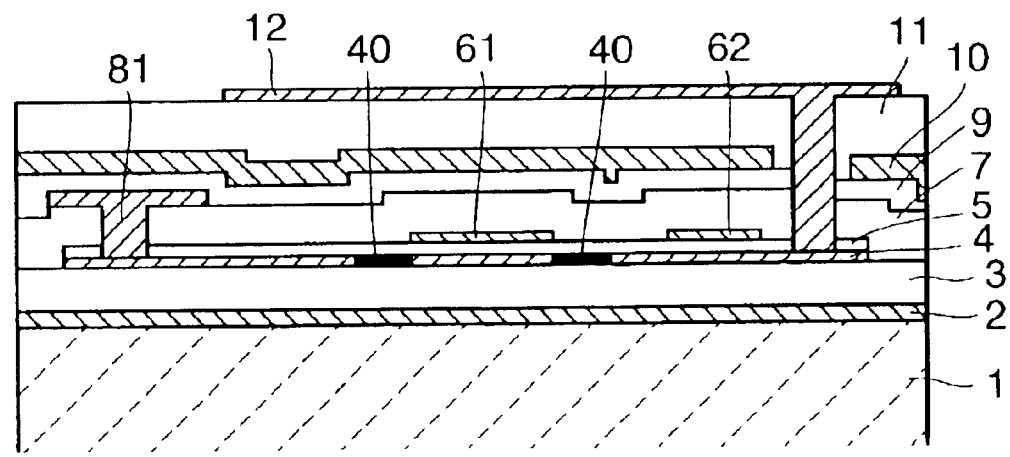

Finally, an ITO (Indium-Tin Oxide) film connected to the polysilicon layer 4 through the contact hole 119 is formed and a pixel electrode 12 is formed by patterning the ITO film, as shown in FIG. 5O.

The pixel substrate shown in FIG. 4 is formed as mentioned above.

Figure 6:
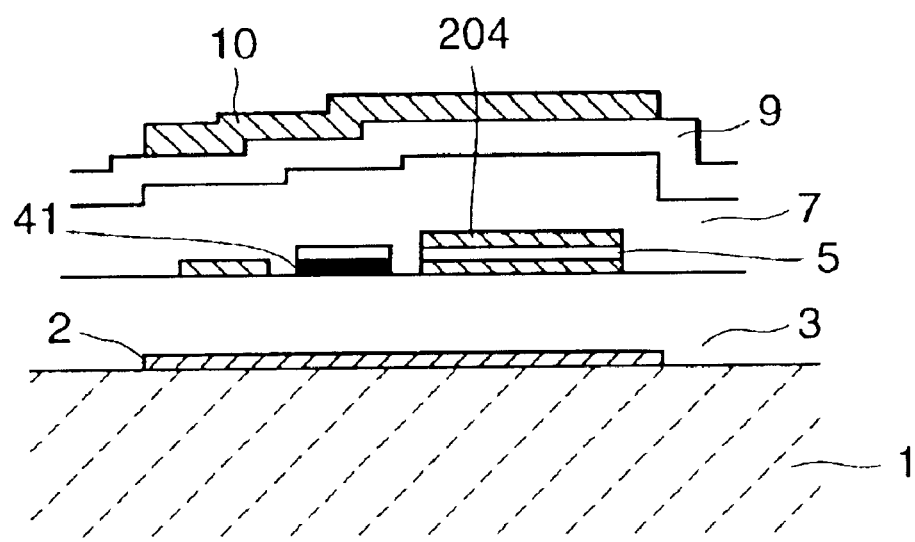
FIG. 6 is a cross section taken along a line B—B in FIG. 4.
Figure 7:
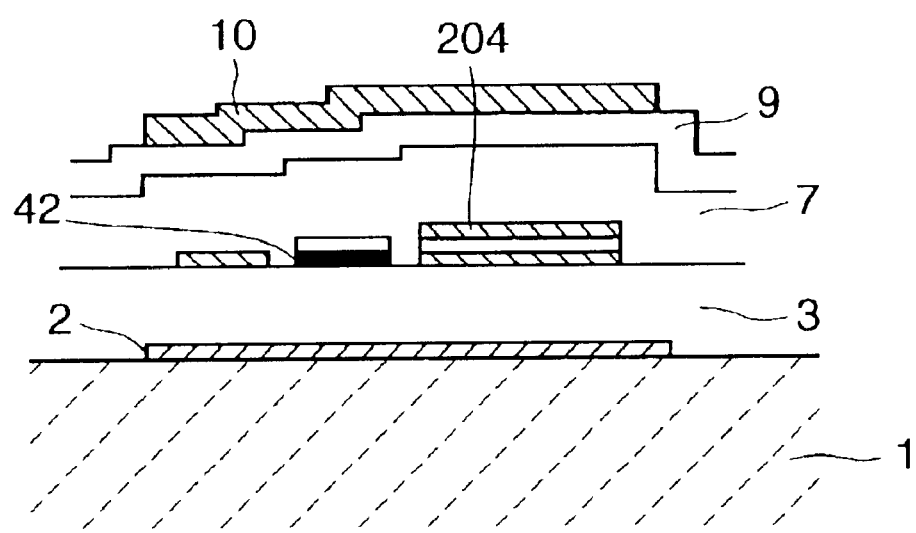
FIG. 7 is a cross section taken along a line C—C in FIG. 4.

FIG. 6 and FIG. 7 are cross sections of portions including the data line side LDD region 41 and the pixel electrode side LDD region 42 of the pixel TFT on the pixel substrate 4 thus fabricated, respectively. That is, the cross section taken along the line B—B and the cross section taken along the line C—C in FIG. 4 correspond to those shown in FIG. 6 and FIG. 7, respectively.

As shown in FIG. 4, FIG. 6 and FIG. 7, the data line side LDD region 41 and the pixel electrode side LDD region 42 have substantially the same light shielding characteristics. The reason for this will be described.

Considering light incident vertically on the liquid crystal display device first, it can be said that intensities of lights reaching the gate line side LDD region 41 and the pixel electrode side LDD region 42 are the same since the structures of the portions including the data side LDD region and the pixel electrode side LDD region are the same as shown in FIG. 4, FIG. 6 and FIG. 7. That is, light incident vertically on the liquid crystal display device is substantially shielded by the upper light shield layer 10 and the lower light shield layer 2 in the region including the data line side LDD region 41 and the region including the pixel electrode side LDD region 42. Therefore, intensities of lights reached these two LDD regions become substantially equal.

Figure 8:
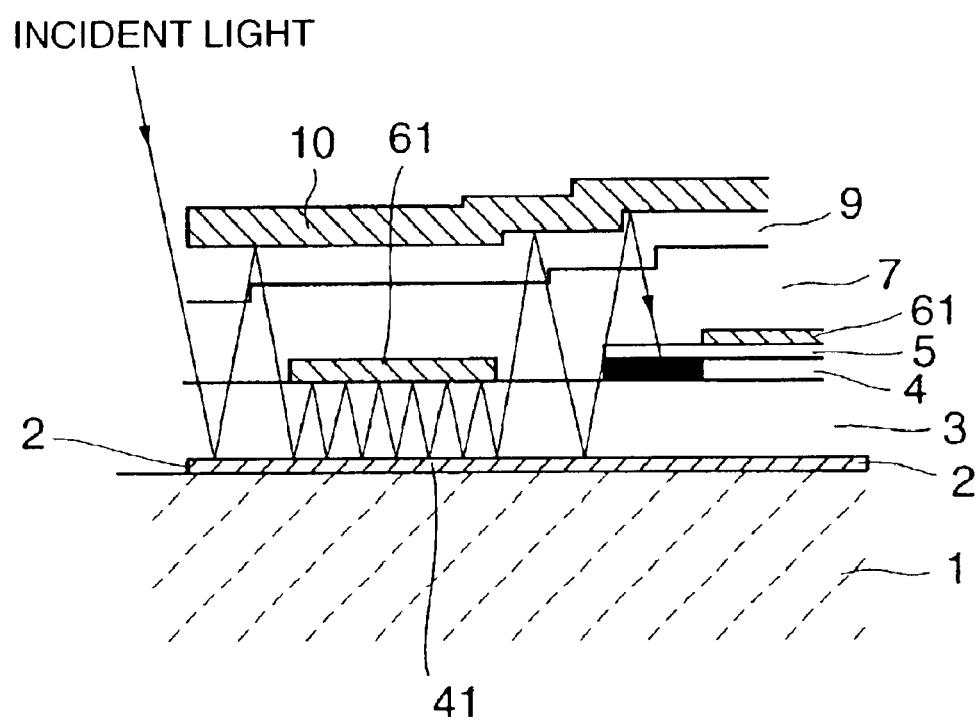
FIG. 8 is a cross sectional view in a direction of arrow 301 in FIG. 4, showing an optical path.

As to light incident on the liquid crystal display device at an angle with respect to a normal line thereof, it enters from the vicinity of an edge portion of the upper light shield layer 10 into the pixel substrate and, after it is repeatedly reflected by the light shield layer 10, the lower light shield layer 2, the polysilicon layer 4 and the gate line 61, successively, while being attenuated, only a portion of the incident light reaches the LDD regions 41 and 42. For example, FIG. 8 is a cross section of the pixel substrate when looked in a direction shown by an arrow 301 in FIG. 4. In this case, light incident obliquely on the vicinity of the edge portion of the upper light shield layer 10 reaches the lower light shield layer 2 and, after reflected by the respective layers, reaches the data line side LDD region 41.

In the pixel substrate according to this embodiment, the gate line side LDD region 41 and the pixel electrode side LDD region 42 are symmetrically arranged about the line A—A in FIG. 4. Further, the pixel electrode 12 and the storage capacitor 204 are also symmetrically arranged about the line A—A, respectively. Therefore, if there is a light path in the cross section looked in the direction of the arrow 301 in FIG. 4, along which light incident on the vicinity of the edge portion of the upper light shield metal layer is reflected repeatedly within the pixel substrate and reaches the data line side LDD region 41, there is a light path in a cross section looked in a direction of an arrow 302 in FIG. 4, which is line-symmetrical to the arrow 301 and along which light incident on the vicinity of the edge portion of the upper light shield metal layer is reflected repeatedly within the pixel substrate and reaches the pixel electrode side LDD region 42. As such, in the pixel substrate shown in FIG. 4, when there is one light path along which light incident on the vicinity of the edge portion of the light shield metal layer reaches one of the LDD regions 41 and 42 after repeated reflections within the pixel substrate while being attenuated, there is the other light path which is line-symmetrical to the one optical path about the line A—A and along which an attenuated incident light reaches the other LDD region.

Therefore, the light shielding characteristics of the data line side LDD region 41 and the pixel electrode side LDD region 42 in FIG. 4 are substantially the same.

It has been usual, in order to prevent degradation of liquid crystal, to drive pixels by AC voltages having alternating polarity in every frame. Therefore, the drain connection of the pixel TFT is switched between the data line 81 and the pixel electrode 12 in every frame. Further, since an electric field of an LDD region between the gate and the drain becomes strong in a period for which the written voltage is maintained, that is, the OFF period of the gate of the pixel TFT, an electric field of the data line side LDD region 41 and the pixel electrode side LDD region 42 become strong in every frame. When light is incident on a portion whose electric field becomes strong, leakage current occurs by mobility of carriers excited by light. In such case, when light-caused leakage currents in the respective LDD regions in a time period during which the data line side becomes drain are different from those when the pixel electrode side becomes drain, luminance of the pixel becomes different in every frame, causing flickers on a display screen. In the liquid crystal display device using the pixel substrate according to this embodiment, the leakage currents in the gate line side LDD region and the pixel electrode side LDD region when the data line side becomes drain are identical to those when the pixel electrode side becomes drain, since the light shielding structures of the data line side LDD region 41 and the pixel electrode side LDD region 42 are identical as mentioned previously. Therefore, in the present liquid crystal display device, occurrence of flickers is restricted.

Now, a pixel substrate of a liquid crystal display device according to a second embodiment will be described with reference to FIG. 9 and FIG. 10.

Figure 9:
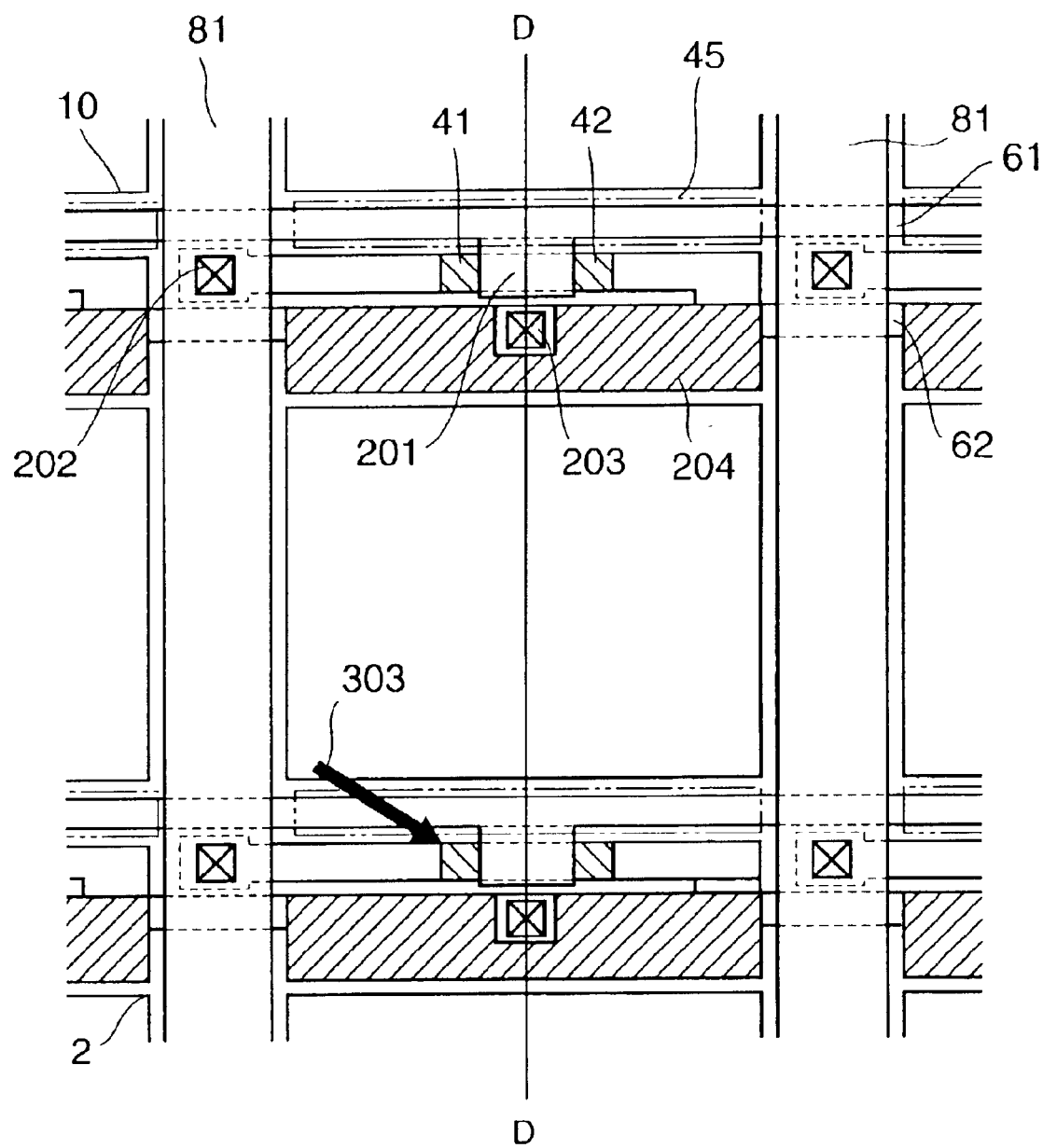
FIG. 9 is a plan view showing a portion of a pixel substrate used in a liquid crystal display device according to a second embodiment of the present invention.

As shown in FIG. 9, in the pixel substrate of the second embodiment, a plurality of pixel TFTs are formed in between adjacent two data lines and along a gate line as in the first embodiment. In the pixel substrate of the second embodiment, a center of a channel region 201 is positioned on a line D—D and a data side LDD region 41 and a pixel electrode side LDD region 42 are formed line-symmetrically about the line D—D. A storage capacitors 204 is also formed symmetrically about the line D—D.

The second embodiment differs from the first embodiment in a provision of a reflected light attenuating region 45 shown by chain lines in FIG. 9. The reflected light attenuating region 45 is formed by, for example, a polysilicon layer and is provided under the gate line 61 with a gate insulating film 5 inserted therebetween. In other words, the gate oxide film 5 is formed and the gate line 61 is formed on the gate oxide film 5. Incidentally, the reflected light attenuating region 45 is formed symmetrically about the line D—D.

The pixel substrate according to the second embodiment is fabricated through the same fabrication steps as those used in the first embodiment. Only difference from the first embodiment is a region of the polysilicon layer 4 and the gate insulating film 5, which is to be etched in the step shown in FIG. 5E. That is, in the step shown in FIG. 5E, the polysilicon layer 4 and the gate insulating film 5 are etched such that the reflected light attenuating region 45 is left as an island. The reflected light attenuating region 45 is not connected to any other metal member and is kept in electrically floating state.

Since the reflected light attenuating region 45 of the pixel electrode in the second embodiment is line symmetry about the line D—D, the light shielding structure on the side of the data line side LDD region 41 is the same as that on the side of the pixel electrode side LDD region 42 for the same reason as that in the pixel substrate of the first embodiment.

Now, a role of the reflected light attenuating region 45 will be described. FIG. 10 is a cross section of the LDD region 41 when looked in a direction of an arrow 303 shown in FIG. 9.

Figure 10:
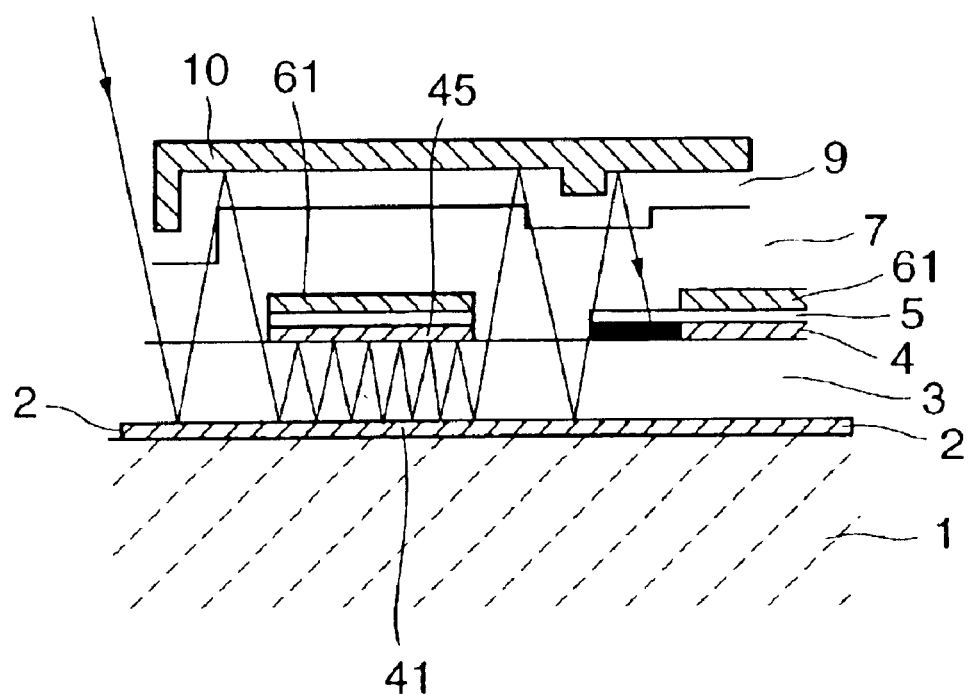
FIG. 10 is a cross sectional view in a direction of arrow 303 in FIG. 9, showing an optical path.

As shown in FIG. 10, light incident on the vicinity of the edge portion of the upper light shielding layer 10 reaches the LDD region 41 after repeatedly reflected by the respective layers within the pixel substrate. In this connection, the light is reflected repeatedly between the reflected light attenuating region 45, which is the polysilicon layer, and the lower light shielding layer 2 a number of times. Since reflectivity of polysilicon is small compared with a metal layer of such as WSi, which is used as the lower light shielding layer 2 and the gate line 61, intensity of light when it reaches the LDD region 41 is more attenuated compared with the case shown in FIG. 8. Therefore, by the provision of the reflected light attenuating region 45, it is possible to improve the light shielding characteristics related to the gate line side LDD region and the pixel electrode side LDD region of the pixel substrate of the second embodiment to thereby reduce the leakage current caused by the light reached the two LDD regions.

Since the light shielding structure of the data line side LDD region 41 is also the same as that of the pixel electrode side LDD region 42 in the liquid crystal display device using the pixel substrate according to this embodiment, leakage currents if any in the respective LDD regions are the same in the case where the data line side LDD region becomes drains and in the case where the pixel electrode side LDD region becomes drain. Therefore, it is possible to restrict the occurrence of flickers on the display screen of the liquid crystal display device.

A pixel substrate of a liquid crystal display device according to a third embodiment of the present invention will be described with reference to FIG. 11 to FIG. 13.

Figure 11:
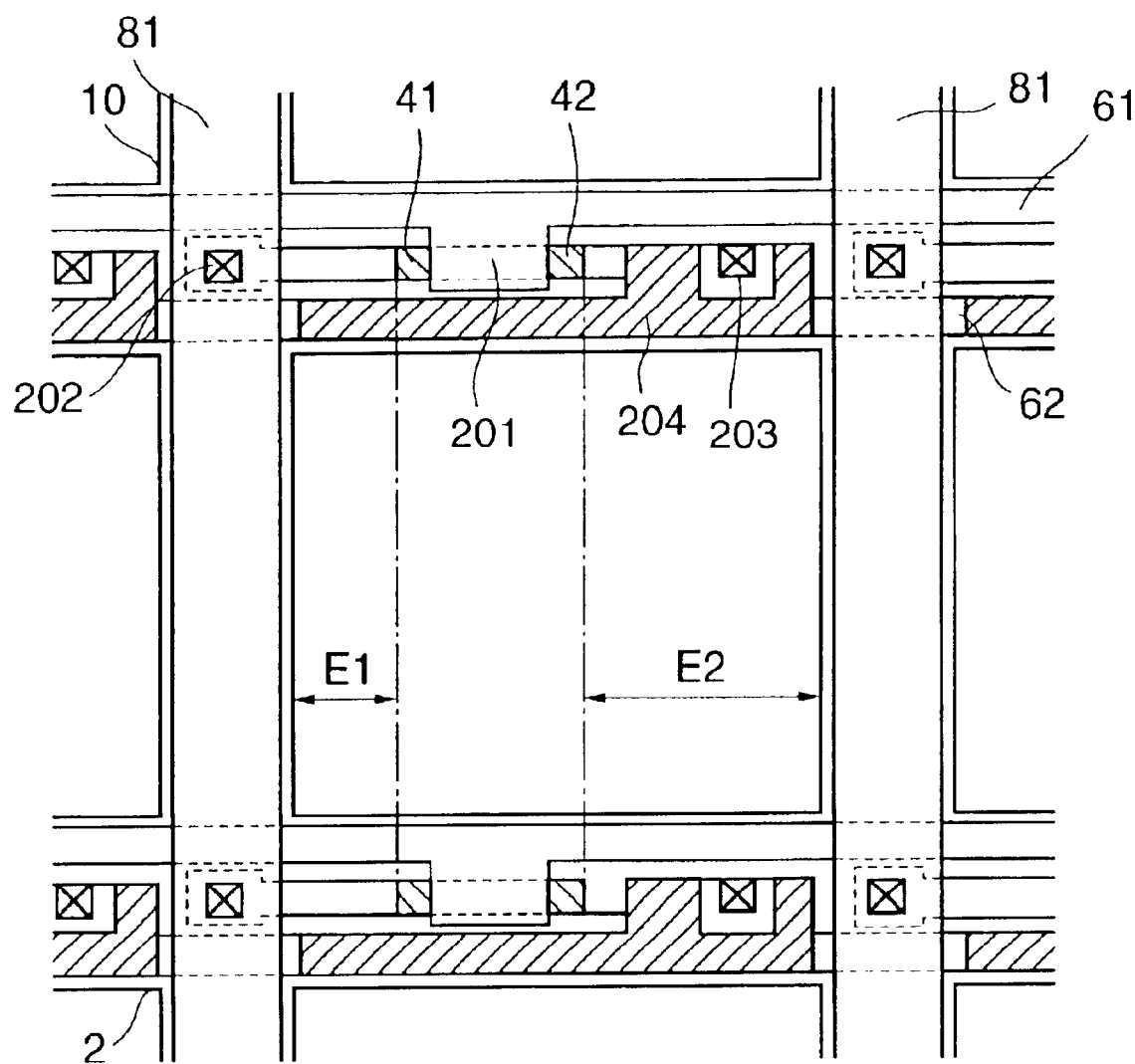
FIG. 11 is a plan view showing a portion of a pixel substrate used in a liquid crystal display device according to a third embodiment of the present invention.

As shown in FIG. 11, in the pixel substrate of this embodiment, the pixel TFTs are arranged in positions remote from the data lines 81 and along the gate lines 61. Each pixel TFT is provided not in an intermediate position between adjacent two data lines 81 as in the first or second embodiment but in a position closer to the data line 81 to which the pixel TFT is connected (on the left side in FIG. 11). That is, the pixel TFT is arranged such that a distance E1 between the data line side LDD region 41 and the upper light shielding layer 10 becomes shorter than a distance E2 between the pixel electrode side LDD region 42 and the upper light shielding layer 10 of the data line 81 of the adjacent pixel.

As mentioned above, by arranging the pixel TFT in the left side in the drawing sheet, there is provided a region on the right side of the pixel TFT, in which a contact 203 and a portion of a storage capacitor 204 can be arranged.

FIG. 11 shows the contact 203 and a portion of the storage capacitor 204, which are arranged in such right side region thus provided. By shifting the position of the pixel TFT to the side of the data line 81 connected thereto and protruding a portion of the storage capacitor 204 to the side of the gate line 61, it is possible to make a length of a wiring for connecting the pixel TFT and the contacts 202 and 203 and an area required for the wiring smaller to thereby increase the aperture ratio of each pixel region.

The pixel substrate of the third embodiment can be fabricated by using the same fabrication steps used in the first embodiment.

As shown in FIG. 11, when the position of the pixel TFT is made closer to the data line to which the same pixel TFT is connected, the distance E2 between the pixel electrode side LDD region 42 and the upper light shielding layer 10 of the data line 81 of the adjacent pixel becomes longer than the distance E1 between the data line side LDD region 41 and the upper light shielding layer 10. Therefore, the light path from the end portion of the upper light shielding layer 10 to the LDD regions after reflected repeatedly within the pixel substrate is predominant on the side of the pixel electrode side LDD region 42, compared with the data line side LDD region 41.

However, if light reaching the pixel electrode side LDD region 42 through a light path, which does not exist on the side of the data line side LDD region 41 and exists on only the side of the pixel electrode side LDD region 42, is attenuated sufficiently by a number of reflections within the pixel substrate, influence of light reaching the pixel electrode side LDD region through the light path shall be negligible. Conversely, light shielding characteristics of the data line side LDD region 41 and the pixel electrode side LDD region 42 can be deemed as being equal if the position of the pixel TFT is determines such that intensities of lights reached the data line side LDD region and the pixel electrode side LDD region while being insufficiently attenuated become equal.

Conditions under which the light shielding characteristics of the data line side LDD region 41 and the pixel electrode side LDD region 42 can be deemed as equal will be described under an assumption that light is sufficiently attenuated when intensity of light reaching an LDD region becomes $1/1000$ or smaller of intensity of light incident on the vicinity of the end portion of the upper light shielding layer 10.

Figure 12:
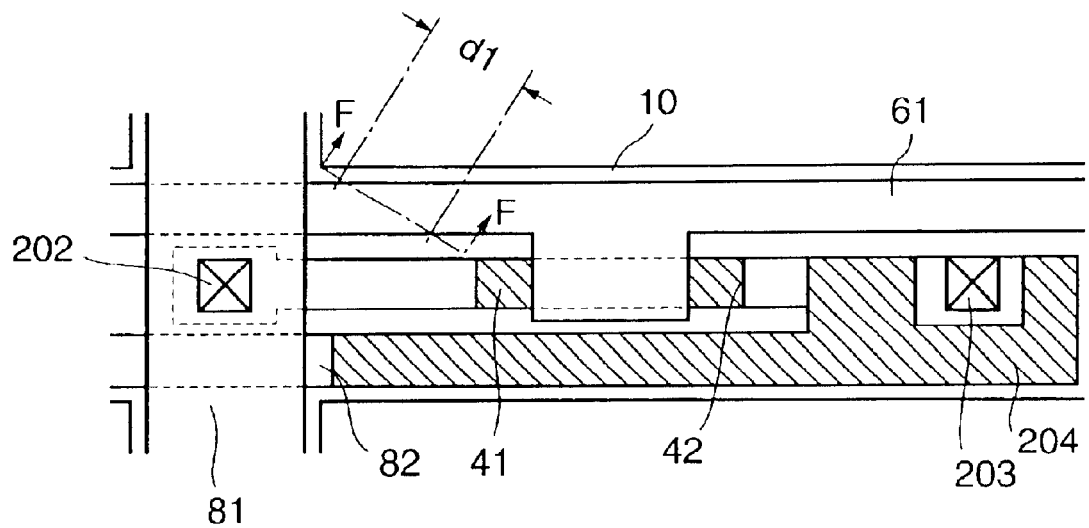
FIG. 12 is an enlarged plan view of a pixel TFT used in the pixel substrate shown in FIG. 11.
Figure 13:
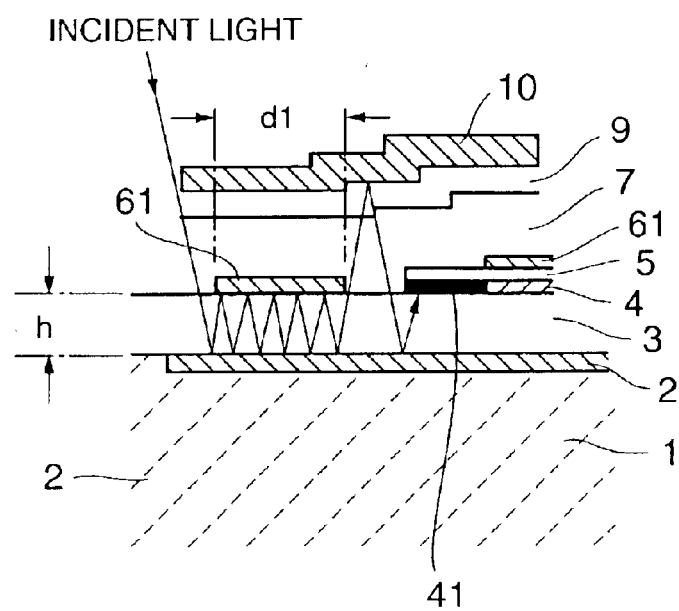
FIG. 13 is a cross section taken along a line F—F in FIG. 12.

FIG. 12 is an enlarged view of the pixel TFT formed on the pixel substrate shown in FIG. 11 and FIG. 13 is a cross section taken along a line F—F in FIG. 12. Incidentally, FIG. 13 also shows a light path of incident light from the vicinity of the edge portion of the upper light shielding layer 10 through the inside of the pixel substrate to the data line side-LDD region.

With reflectivity of WSi used as a material of the lower light shielding film 2 and the gate line 61 being 60%, in order that intensity of light reaching an LDD region becomes $1/1000$ or smaller of intensity of light incident on the vicinity of the edge portion of the upper light shielding layer 10 due to repetitive reflections between the lower light shielding film 2 and the gate line 61, the number of repetitive reflections must be 7 or more, which corresponds to 14 or more reflections. That is, in the example shown in FIG. 13, it is necessary that light incident on the vicinity of the edge portion of the upper light shielding layer 10 must be repetitively reflected 7 times between the gate line 61 and the lower light shielding layer 2 within a time for which light travels a distance d1 along the gate line in the optical path from the incident point to the data line side LDD region 41. Assuming that the maximum value of the angular distribution of incident light components (maximum incident angle) is 11° and thickness of the first interlayer film 3 is represented by h, the distance d1, which is necessary to repeat 7 or more reflections, is obtained by the following equation:

$$d1 > 2 \cdot h \cdot \tan 11° \cdot 7 \quad \text{(Equation 1)}$$

When the thickness of the first interlayer 3 is 1 μm, for example, it is clear from the Equation 1 that d1 must be larger than 2.7 μm. In this case, it is possible to deem the light shielding characteristics of the data line side LDD region 41 and the pixel electrode side LDD region 42 are equal even when the pixel TFT is provided closer to the data line to which the TFT is connected, provided that d1 is within a range larger than 2.7 μm.

As described, since the light shielding structure of the data line side LDD region 41 is also substantially the same as that of the pixel electrode side LDD region 42 in this embodiment, amounts of leakage currents if any in the respective LDD regions are the same in the case where the data line side LDD region becomes drains and in the case where the pixel electrode side LDD region becomes drain. Therefore, it is possible to restrict the occurrence of flickers in the liquid crystal display device.

Further, in this embodiment in which the data line side LDD region 41 is arranged closer to the data line contact 202, it is possible to shift the position of the pixel electrode 203 and to reduce an area necessary for wiring. Therefore, it is possible to increase the aperture ratio of the pixel compared with the first or second embodiment.

Now, a fourth embodiment of the present invention will be described with reference to FIG. 14 to FIG. 16.

The pixel substrate of the fourth embodiment differs from the pixel substrate of the third embodiment in that the fourth embodiment includes a reflected light attenuating region 45 shown by double-dotted chain line.

In this embodiment, the pixel TFT is provided in a position closer to the data line 81 to which the pixel TFT is connected as in the third embodiment. Therefore, the distance G2 between the pixel electrode side LDD region 42 and the upper light shielding layer 10 of the data line 81 of the adjacent pixel becomes longer than the distance G1 between the data line side LDD region 41 and the upper light shielding layer 10 of the data line 81, as shown in FIG. 14. However, as described with respect to the third embodiment, it is possible to deem that the light shielding characteristics of the data line side LDD region 41 and the pixel electrode side LDD region 42 become equal if the pixel TFT is separated in position from the associated data line 81 by a predetermined distance.

Conditions under which the light shielding characteristics of the data line side LDD region 41 and the pixel electrode side LDD region 42 can be deemed as equal in the third embodiment will be described under an assumption that light is sufficiently attenuated when intensity of light reaching an LDD region becomes ¹⁄₁₀₀₀ or smaller of intensity of light incident on the vicinity of the edge portion of the upper light shielding layer 10.

Figure 14:
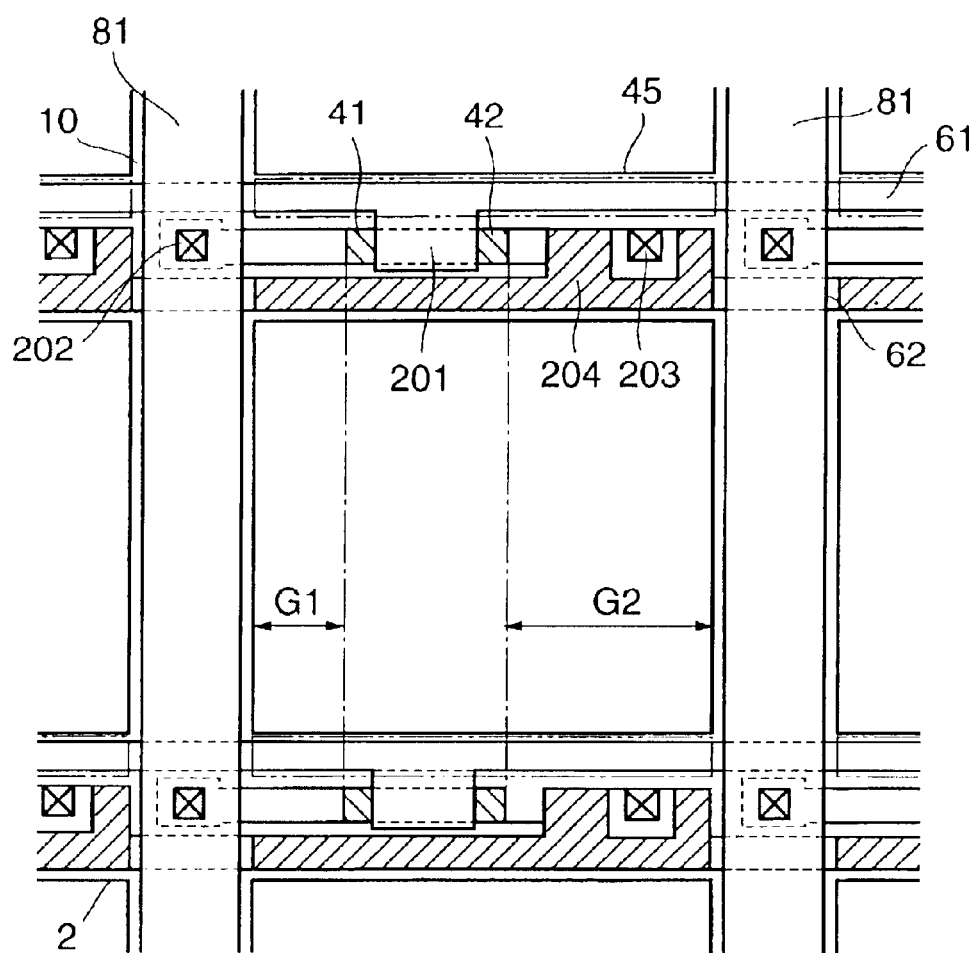
FIG. 14 is a plan view showing a portion of a pixel substrate used in a liquid crystal display device according to a fourth embodiment of the present invention.
Figure 15:
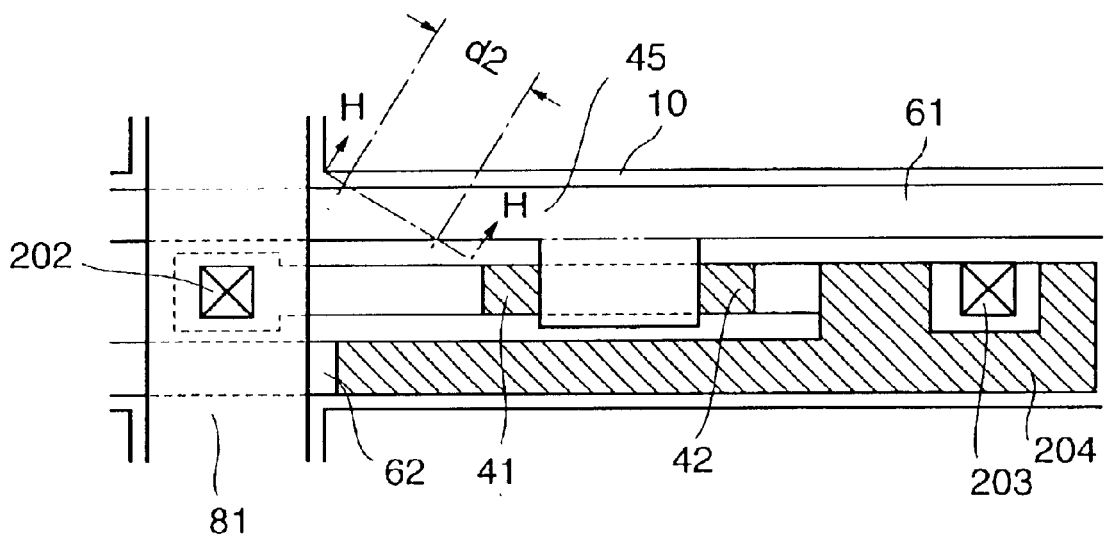
FIG. 15 is an enlarged plan view of a pixel TFT used in the pixel substrate shown in FIG. 14.
Figure 16:
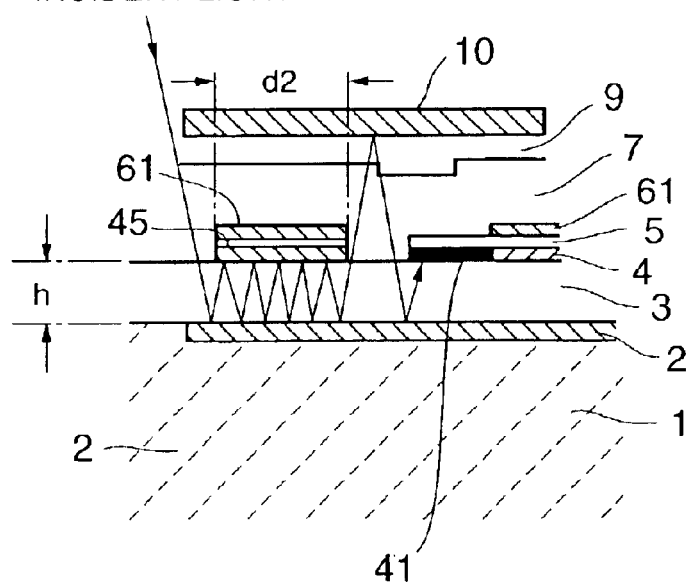
FIG. 16 is a cross section taken along a line H—H in FIG. 15.

FIG. 15 is an enlarged view of the pixel TFT formed on the pixel substrate shown in FIG. 14 and FIG. 16 is a cross section taken along a line H-H in FIG. 15 to show a light path of incident light from the vicinity of the edge portion of the upper light shielding layer 10 through the inside of the pixel substrate to the data line side LDD region 401.

As shown in FIG. 16, light incident on the vicinity of the edge portion of the upper light shielding layer 10 passes through the pixel substrate to the data line side LDD region 41 after repetitively reflected between the lower light shielding layer 2 and the reflected light attenuating region 45. With reflectivity of WSi used as a material of the lower light shielding film being 60% and reflectivity of polysilicon used in the reflected light attenuating region 45 being 30%, in order that intensity of light reaching an LDD region becomes ¹⁄₁₀₀₀ or smaller of intensity of light incident on the vicinity of the edge portion of the upper light shielding layer 10 due to repetitive reflections between the lower light shielding film 2 and the reflected light attenuating region 45, the number of repetitive reflections must be 5 or more. That is, in FIG. 16, it is necessary that, in the light path from the edge portion of the upper light shielding layer 10 through the inside of the pixel substrate to the data line side LDD region 41, light incident on the vicinity of the edge portion of the upper light shielding layer 10 must be repetitively reflected 5 times or more between the reflected light attenuating region 45 and the lower light shielding layer 2 within a time for which light travels a distance d2.

Assuming that the maximum value of the angular distribution of incident light (maximum incident angle) is 11° and thickness of the first interlayer film 3 is represented by h, the distance d2, which is necessary to repeat 5 or more reflections, is obtained by the following equation:

$$d2 > 2 \cdot h \cdot \tan 11° \cdot 5 \quad \text{(Equation 2)}$$

When the thickness of the first interlayer 3 is 1 μm, for example, it is clear from the Equation 2 that d2 must be larger than 1.9 μm. Therefore, in this case, it is possible to deem the light shielding characteristics of the data line side LDD region 41 and the pixel electrode side LDD region 42 are equal even when the pixel TFT is provided closer to the data line to which the TFT is connected, provided that d2 is within a range larger than 1.9 μm.

As described, since the light shielding structure of the data line side LDD region 41 is substantially the same as that of the pixel electrode side LDD region 42 in this embodiment, amounts of leakage currents if any are the same in the case where the data line side LDD region becomes drains and in the case where the pixel electrode side LDD region becomes drain. Therefore, it is possible to restrict the occurrence of flickers in the liquid crystal display device.

Further, in this embodiment in which the data line side LDD region 41 is arranged closer to the data line contact 202, it is possible to shift the position of the pixel electrode 203 and to reduce an area necessary for wiring. Therefore, it is possible to increase the, aperture ratio of the pixel compared with the first or second embodiment.

Further, this embodiment includes the reflected light attenuating region 45, which is the polysilicon layer, is provided in a lower portion of the gate line 61. Therefore, it becomes possible to bring the data line side LDD region 41 close to the contact 202 to thereby increase the aperture ratio of the pixel compared with the first or second embodiment.

According to the present invention, the light shielding characteristics of the two LDD regions are made equal by arranging the pixel TFTs in positions remote from the data line and along the gate lines. Therefore, it is possible to make, amounts of leakage currents in these two LDD regions equal to thereby restrict occurrence of flickers in the liquid crystal display device.

Further, according to the present invention, the pixel TFTs arranged along the gate lines are shifted to the side of the gate lines to which the pixel TFTs are connected. Therefore, it is possible to increase the aperture ratio of the pixels.

What is claimed is:

1. A liquid crystal display device comprising:
   a plurality of parallel gate lines formed on a transparent insulating substrate;
   a plurality of parallel data lines formed on said transparent insulating substrate such that the plurality of said parallel data lines and the plurality of said parallel gate lines cross each other with the plurality of said parallel data lines being electrically insulated from the plurality of said parallel gate lines; and
   a plurality of transistors provided on said transparent insulating substrate in positions corresponding to pixel regions partitioned in matrix by said gate lines and said data lines, respectively, each of the plurality of said transistors including a data line side LDD region and a pixel side LDD region and said positions of said transistors being remote from said data lines and along said gate lines such that light shielding characteristics of said data line side LDD region and said pixel side LDD region become substantially equal;
   wherein each of the plurality of said transistors is arranged in an intermediate position between adjacent two of said data lines.

2. A liquid crystal display device comprising:
   a plurality of parallel gate lines formed on a transparent insulating substrate;
   a plurality of parallel data lines formed on said transparent insulating substrate such that the plurality of said parallel data lines and the plurality of said parallel gate lines cross each other with the plurality of said parallel data lines being electrically insulated from the plurality of said parallel gate lines; and
   a plurality of transistors provided on said transparent insulating substrate in positions corresponding to pixel regions partitioned in matrix by said gate lines and said data lines, respectively, each of the plurality of said transistors including a data line side LDD region and a pixel side LDD region and said positions of said transistors being remote from said data lines and along said gate lines such that light shielding characteristics of said data line side LDD region and said pixel side LDD region become substantially equal;
   wherein each of the plurality of said transistors is arranged in a position remote from adjacent two of said data lines by predetermined distances, respectively, and closer to one of said adjacent data lines, to which said transistor is connected; and further comprising a storage capacitor in every said pixel region, wherein said storage capacitors are formed along said gate lines such that said transistors are positioned between adjacent gate lines and each said storage capacitor has protruded portions partially protruding on the side of said pixel side LDD region of said transistor and on the side of said gate line.

3. A liquid crystal display device as claimed in claim 2, wherein a contact of each said pixel region is provided in said protruded portion of said storage capacitor.

4. A liquid crystal display device comprising:

a plurality of parallel gate lines formed on a transparent insulating substrate;

a plurality of parallel data lines formed on said transparent insulating substrate such that the plurality of said parallel data lines and the plurality of said parallel gate lines cross each other with the plurality of said parallel data lines being electrically insulated from the plurality of said parallel gate lines; and a plurality of transistors provided on said transparent insulating substrate in positions corresponding to pixel regions partitioned in matrix by said gate lines and said data lines, respectively, each of the plurality of said transistors including a data line side LDD region and a pixel side LDD region and said positions of said transistors being remote from said data lines and along said gate lines such that light shielding characteristics of said data line side LDD region and said pixel side LDD region become substantially equal;

further comprising a reflected light attenuating layer provided below a gate insulating film positioned below said gate line.

* * * * *